(12) United States Patent
Watanabe et al.

(10) Patent No.: US 6,269,303 B1
(45) Date of Patent: Jul. 31, 2001

(54) VEHICLE NAVIGATION SYSTEM AND RECORDING MEDIUM

(75) Inventors: Kazuyuki Watanabe; Takaharu Fukaya; Norihiro Tomioka, all of Anjo (JP)

(73) Assignee: Aisin AW Co., Ltd. (JP)

( * ) Notice: Subject to any disclaimer, the term of this patent is extended or adjusted under 35 U.S.C. 154(b) by 0 days.

(21) Appl. No.: 09/131,333

(22) Filed: Aug. 7, 1998

(30) Foreign Application Priority Data

Aug. 8, 1997 (JP) ..................................... 9-214781

(51) Int. Cl.$^7$ ....................................... G06F 7/00
(52) U.S. Cl. ............................. 701/209; 340/988
(58) Field of Search ................................. 701/117, 200, 701/201, 202, 208, 209, 210, 211; 340/988, 995

(56) References Cited

U.S. PATENT DOCUMENTS

| | | | |
|---|---|---|---|
| 5,410,485 | * 4/1995 | Ichikawa | 701/209 |
| 5,774,073 | * 6/1998 | Maekawa et al. | 340/995 |
| 5,878,368 | * 3/1999 | DeGraff | 701/209 |
| 5,911,773 | * 6/1999 | Mutsuga et al. | 701/200 |
| 5,977,885 | * 11/1999 | Watanabe | 340/995 |

\* cited by examiner

Primary Examiner—William A. Cuchlinski, Jr.
Assistant Examiner—Edward Pipala
(74) Attorney, Agent, or Firm—Lorusso & Loud

(57) ABSTRACT

The invention provides a system which can select a less crowded road as a road section of a guidance route. The vehicle navigation system executes a route search from a departing point or the present position of the vehicle to the destination and provides guidance for the guidance route, taking into account whether a road is in a city area or a suburban area. The vehicle navigation system includes an information memory for storing map information for each road section, a route search routine for searching for a route from the present position to the destination based on map information stored in the information memory, and a decision routine for determining whether a road to be searched is in a city area or in a suburban area, and wherein the route search searches for a route by weighting the roads which are determined to be in the city area in order to give a lower preference thereto.

8 Claims, 12 Drawing Sheets

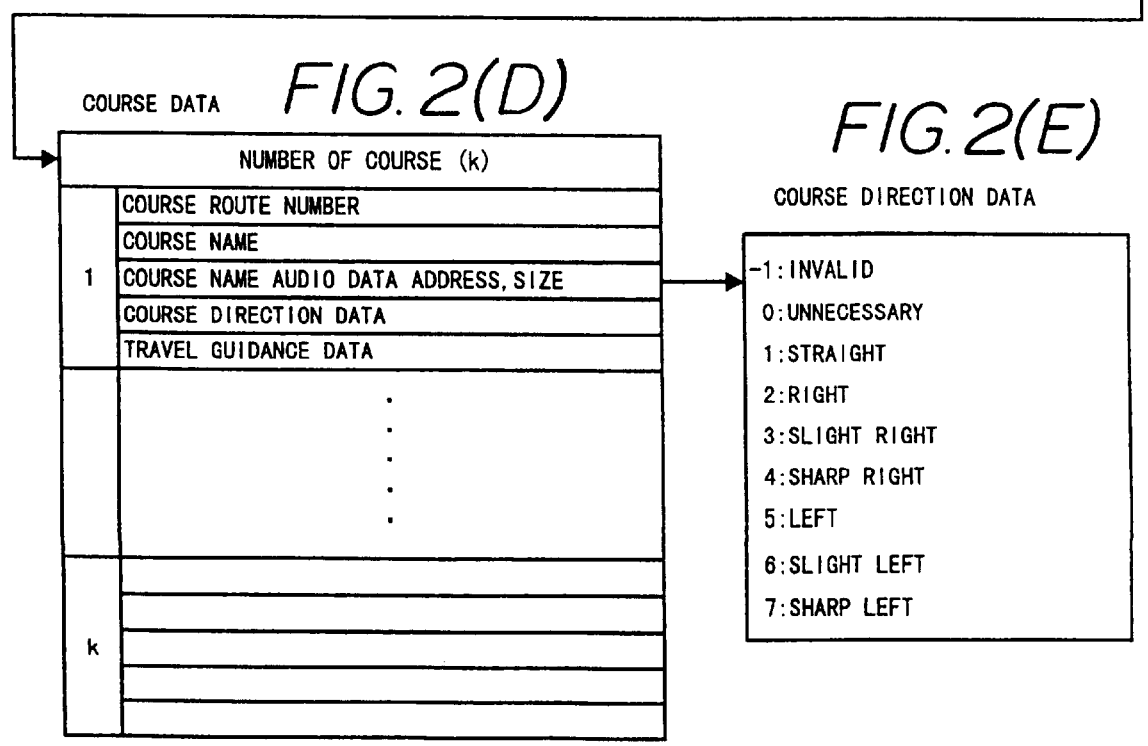

FIG. 3(A)

ROAD ATTRIBUTION DATA

| | | |
|---|---|---|
| OVERPASS /UNDERGROUND DATA | OVERPASS | |
| | ADJACENT TO OVERPASS | ○ |
| | UNDERGROUND | |
| | ADJACENT TO UNDERGROUND | |
| NUMBER OF LANE | THREE LANES OR MORE | |
| | TWO LANES | ○ |
| | ONE LANE | |
| | NO CENTERLINE | |
| CITY AREA/SUBURBAN AREA | CITY AREA ROAD | ○ |
| | SUBURBAN AREA ROAD | |

FIG. 3(B)

ROAD NAME DATA

| ROAD CLASSIFICATION | | CLASSIFICATION NUMBER |
|---|---|---|
| HIGHWAY | MAIN ROAD | 1 |
| | JUNCTION | 2 |
| CITY HIGHWAY | MAIN ROAD | 3 |
| | JUNCTION | 4 |
| TOLL ROAD | MAIN ROAD | 5 |
| | JUNCTION | 6 |
| ORDINARY ROAD { | NATIONAL ROAD | 7 |
| | PREFECTURAL ROAD | 8 |
| | OTHERS | 9 |

FIG. 3(C)

CAUTION DATA

| | |
|---|---|
| RAILROAD CROSSING | ○ |
| TUNNEL ENTRANCE | |
| TUNNEL EXIT | |
| WIDTH REDUCTION POINT | |
| NONE | |

FIG. 3(D)

TRAVEL GUIDANCE DATA

| | |
|---|---|
| TOWARD RIGHT | |
| TOWARD LEFT | |
| TOWARD CENTER | ○ |
| NONE | |

FIG. 4

INTERSECTION DATA

| | NUMBER (k) OF INTERSECTIONS |
|---|---|
| 1 | INTERSECTION POINT NO. |
| | INTERSECTION POINT NAME |
| | TRAFFIC LIGHT DATA |
| | CROSSWALK DATA |
| | BRANCH POINT CHARACTERISTICS DATA |
| | ENTRY ROAD DATA |
| | EXIT ROAD DATA |
| | LANDMARK DATA |
| ⋮ | ⋮ |
| k | |

FIG. 5

GUIDE PHRASE DATA

| PHRASE CLASSIFICATION | PHRASE DESCRIPTION |
|---|---|
| A. DISTANCE PHRASE | 1 ABOUT 700M AHEAD<br>2 ABOUT 300M AHEAD<br>3 SOON<br>4 AHEAD OF THERE<br>5 AHEAD OF HERE<br>... ... ... ... ... ... ... ... |
| B. DIRECTION PHRASE | 1 GO STRAIGHT<br>2 TURN TO THE RIGHT<br>3 TURN TO THE LEFT<br><br>... ... ... ... ... ... ... ... |
| C. CHARACTERISTICS PHRASE | 1 INTERSECTION POINT WITHOUT TRAFFIC LIGHT<br>2 NEXT TRAFFIC LIGHT<br>3 SECOND TRAFFIC LIGHT FROM HERE<br>4 INTERSECTING POINT BEFORE TRAFFIC LIGHT<br>5 INTERSECTING POINT BEYOND TRAFFIC LIGHT<br>6 NEXT GAS STAND<br>... ... ... ... ... ... ... ... |
| ⋮ | ⋮ |

FIG. 7(A)
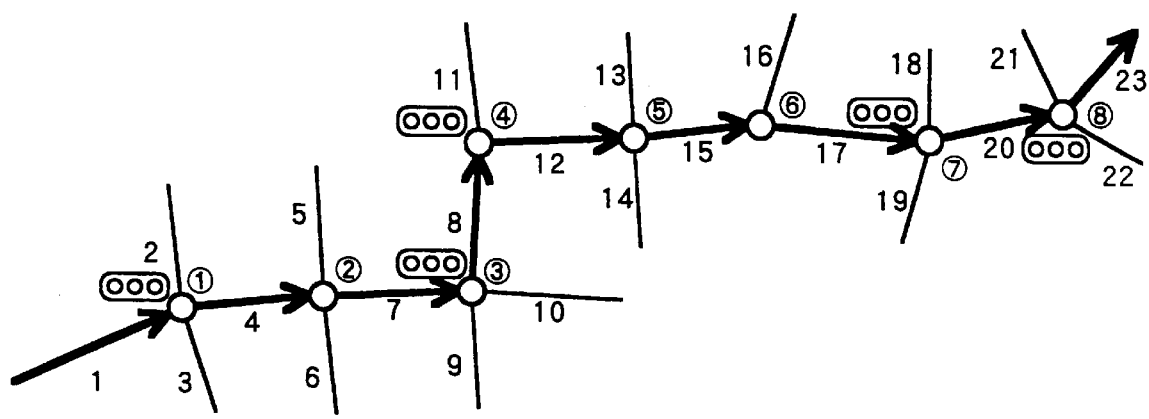
FIG. 7(B)
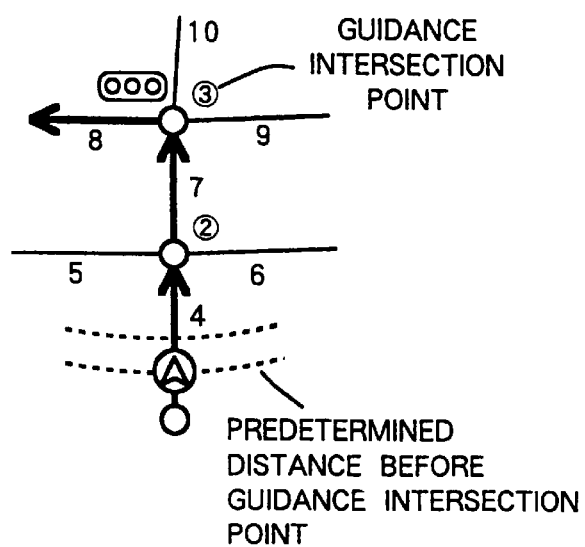
GUIDANCE ROAD NUMBER DATA
| NUMBER OF GUIDANCE ROAD(n) |
| --- |
| 1 |
| 4 |
| 7 |
| 8 |
| 12 |
| ⋮ |
| |
| |
FIG. 7(C)

VEHICLE NAVIGATION SYSTEM AND RECORDING MEDIUM

BACKGROUND OF THE INVENTION

This invention relates to a vehicle navigation system and a recording medium for execution of a route search to identify a guidance route from a departing point or the present position of a vehicle to a destination, and which provides route guidance for the identified guidance route.

Vehicle navigation systems search for a route from a departing point or the present position of the vehicle to the designated destination and provide route guidance for the thus identified "guidance route." To accomplish this, the vehicle navigation system has a functional capability allowing the driver to designate a road preference and provides for search for a route including the designated road. In addition, some navigation systems allow for selection of a desired road from a list of the roads traversing the entire country and for search of a route with the selected road given priority. Further, some navigation systems operate to search for the shortest distance route, the shortest time route, or the minimum cost (weighted) route and to display respective routes distinguished from each other (see, for example, Japanese Patent Publication No. 130299/89).

In a conventional system which searches for a route by giving priority to main roads, i.e., roads of wide width, routes passing through relatively congested city areas are likely to be included in the search. This results in a problem with the quality of the identified "guidance route" in that the travel time for the vehicle may be excessively long relative to the distance of the route.

Further, some of the conventional systems have a functional capability allowing for designating a road to be avoided; however, this capability complicates their operation since these systems require designation of a road that the driver desires to avoid for every route search. When the route from a starting point to a destination is long, the number of the roads to be selected tends to be huge and the selection operation becomes very difficult. Even if the roads to be selected are classified as highways, toll ways, interstates, local roads, etc., still each road classification contains a huge number of roads. As a result, a difficulty arises in that several operations taking into account classification and hierarchy are required to designate a road the driver desires to avoid and this complicates operation of the system. Further, in the case where the road to be designated has no name or the name of the road is unknown, the system can't select a road.

SUMMARY OF THE INVENTION

An object of the present invention is to provide for easy selection of a road segment which is less crowded, as part of a guidance route, in order to solve the above problems.

In order to attain the above object, there is provided a vehicle navigation system which searches for a route from a departing point or a present position to a destination and provides route guidance for thus identified route, and wherein the navigation system determines whether or not a road is in an urban area and searches for a route to a destination based on that determination.

According to another aspect of the invention, there is provided a vehicle navigation system, comprising information memory means for storing map information and road data for each road segment, route search means for searching for a route from a present position to a destination based on map information stored in the information memory means, decision means for determining whether or not the road to be searched by the route search means is in an urban area and wherein the route search means searches for a route giving a weighted value to the roads, which are determined to be in the urban area by the decision means, in order to give lower preference for urban area roads. The vehicle navigation system further includes condition setting means for setting predetermined conditions, and wherein the decision means makes its determination based on the conditions set by said condition setting means. The information memory means contains road information including information which identifies roads as either in a city area or not in a city area. Alternatively, the information memory means may store information defining city areas and the decision means determines whether or not a given road segment is within or runs through an area identified as a city area.

In another aspect the invention provides a vehicle navigation system including an information memory means for storing map data and other guidance data relating to route search and route guidance, input means for inputting geographical points such as a point of departure or a present position and a destination, etc., and for inputting designation of priorities for different types and/or locations of roads, output means for outputting said points, a guidance route determined by search route, and route guidance for the guidance route, and route search means for searching for a route to a destination based on information input through said input means. The route search means controls the search cost for each road within an area based on a designation, input through the input means, which gives priority to certain areas and/or roads. The route search means executes a route search taking into account the designation input assigning priority designation to either suburban areas or urban (city) areas. To this end, the information memory means may contain road information which includes information identifying roads as either suburban or city.

BRIEF DESCRIPTION OF THE DRAWINGS

The invention will be described with reference to the drawings in which:

FIGS. 2(A)–2(E) are diagrams of an example of the data structure of guidance road data, etc.;

FIG. 3(A) is a diagram of an example of data structure of road attribution data. FIG. 3(B) is a diagram of an example of data structure of road name data; FIG. 3(C) is a diagram of an example of data structure of caution data; and FIG. 3(D) is a diagram of an example of data structure of travel guidance data;

FIG. 4 is a diagram of an example of data structure such as intersection point data;

FIG. 5 is a diagram of an example of data such as guidance phrase data;

FIGS. 7(A), 7(B) and 7(C) are diagrams illustrating the setting of a route by route search of data such as that shown in FIG. 4;

DESCRIPTION OF PREFERRED EMBODIMENTS

Figure 1:
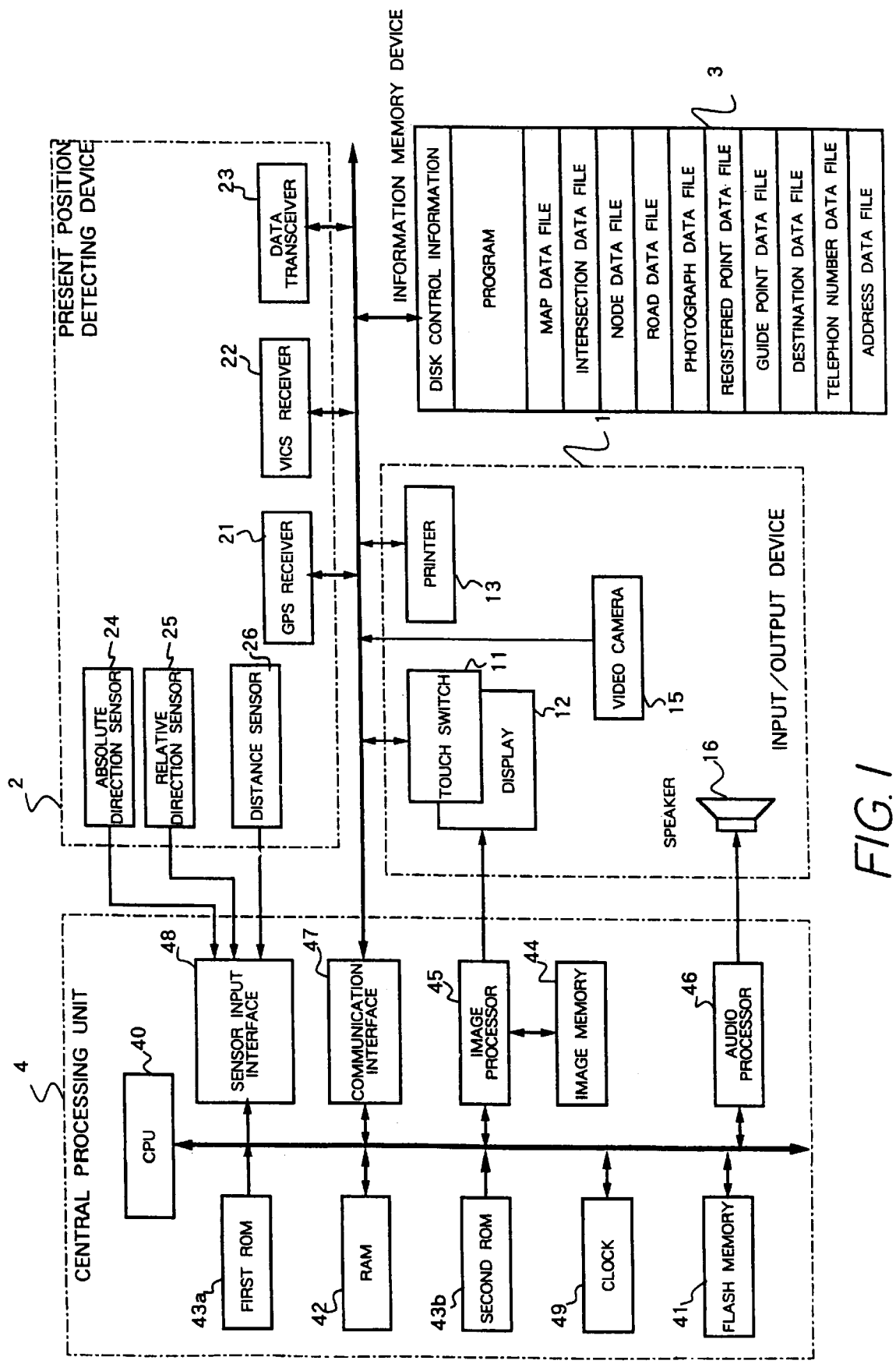
FIG. 1 is a block diagram of one embodiment of the vehicle navigation system according to the present invention.

FIG. 1 is a diagram showing one embodiment of a navigation system according to the present invention. As shown in FIG. 1, a navigation system for a vehicle according to the present invention comprises an input/output unit 1 for input/output of information relating to route guidance, a present position detection device 2 for detecting information relating to the present position of the vehicle, an information memory device 3 containing stored navigation data necessary for route guidance and programs (application and/or OS), etc., and a central processing unit 4 for executing route searches, for providing a route guidance display, and for controlling the overall system.

Figure 1A:
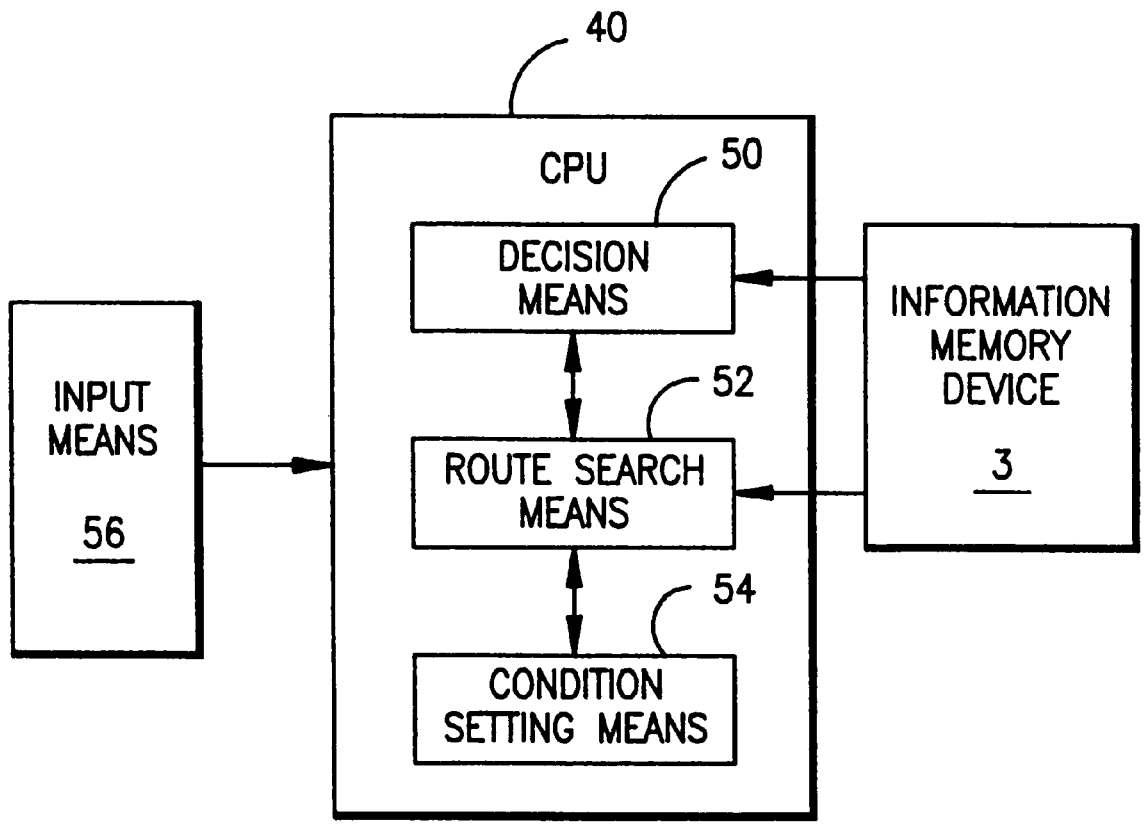
FIG. 1A is a block diagram of the CPU of the embodiment of FIG. 1, showing input and output.

FIG. 1A shows CPU 40 programmed in accordance with one embodiment of the present invention to include a decision means for determining whether or not road sections identified in the road data file of memory 3 are within an urban area or suburban area designated by input through input means 56, in this embodiment constituted by touch switch 11 on display screen 12. The nature of the stored data will determine the manner in which the decision means 50 makes its determination. If the road data stored in information memory device 3 correlates identified road sections with designations as either located in an urban area or not, the decision means 50 need only read such road data from the information memory device 3. On the other hand, if there are no such correlated designations in the road data, the decision means 50 must determine for each road section to be considered in conducting the route search, by referring to the map data file in information memory device 3, to determine whether or not a road segment is within an urban (city) area. The route search means 52 then assigns weighted values, i.e. "search cost" values, in accordance with the determination made by the decision means, and in conducting the search gives priority to those road sections or segments having the lowest "search cost." For example, the route search means 52 might multiply a preassigned search cost by 0.8 pursuant to a determination by decision means 50 that the road section does not lie within or pass through an urban area. Condition setting means 54 functions to impose additional conditions on the route search executed by route Search means 52, responsive to condition designations input through input means 56.

The input/output unit 1 functions to enter destinations, to allow the driver to instruct the central processing unit 4 to execute navigation processing in such a manner that guidance information can be output by voice and/or a screen display as required by the driver, and to print out processed data. As means for implementing these functions, the input section of the input/output unit 1 has a touch switch 11 which functions as an input means in cooperation with display 12 for displaying input data on a screen and for automatically displaying route guidance on the screen in response to a request from the driver. The input/output unit 1 additionally includes a printer 13 for printing out data processed by the central processing unit 4 and data stored in the information memory device 3, and a speaker 16 for outputting route guidance by voice.

It is possible to add a voice recognition unit for enabling voice input and/or a record card reader for reading data recorded on an IC card or a magnetic card. There can be further added a data communication unit for exchanging data with a remote information source such as an information center, in which data necessary for navigation has been stored, for providing information via communication lines in response to a demand of the driver or a notebook type electronic unit stored in advance with data specific to the driver such as map data or destination data.

The display 12 is constituted by a color CRT or color liquid-crystal display device. On the basis of map data and guidance data processed by the central processing unit 4, the display 12 outputs, as a color display, all screens necessary for navigation, such as a route setting screen, an interval view screen and an intersection screen. The display 12 also displays buttons for setting route guidance, and changing over guidance and screens during the route instruction. In particular, transit-intersection information such as the names of the intersections to be traversed is displayed in color in the form of a pop-up menu on the interval view screen as required.

The display 12 is provided inside the instrument panel in the vicinity of the driver's seat. Observing the interval view screen enables the driver to ascertain the present location of the vehicle and to obtain information regarding a route ahead from this location. Further, the display 12 is provided with the touch switch 11 that corresponds to the display of function buttons. The operations described above are executed based upon signals entered by touching the buttons. Input signal generating means constituted by the buttons and touch switches constitute the input: section.

The present position detection means 2 comprises a GPS receiver 21 which utilizes a global positioning system (GPS), a VICS information receiver 22 for receiving signals such as FM multiplex signals, radio beacon signals, and optical beacon signals, a data transceiver 23 for communicating information bi-directionally with the information center (e.g., ATIS) and other vehicles by utilizing, for example, a cellular phone (car phone) or a PC (personal computer), an absolute directional sensor 24, which detects the driving direction of the vehicle as an absolute direction, such as a geomagnetic sensor which utilizes the earth's magnetism, a relative direction sensor 25, such as a steering sensor or a gyro sensor, for detecting the driving direction of a vehicle as a relative direction, and a distance sensor 26 for detecting the distance travelled from the number of revolutions of a wheel. The present position detecting means communicates information relating to the travel of the vehicle such as road information and traffic information, detects information relating to the present position of the vehicle, and communicates information relating to the present position.

The information memory device 3 is an external storage device storing navigation programs and data, such as a CD-ROM. The stored programs include a processing program for route searching, the program represented by the flow chart of FIG. 6, the programs for display output control for the display of route guidance and voice output control for voice guidance, the data necessary for operation of these programs, and also display information data necessary for route guidance and generation of map displays. The data comprises files such as files of map data, search data, guidance data, map matching data, destination data, registered-location data, road data, classification data and landmark data, i.e., it contains all data necessary for operation of the navigation system. The systems of the invention may be of the type in which the data is exclusively stored in the CD-ROM whereas the programs are stored in the central processing unit.

The central processing unit 4 comprises a CPU 40 for executing various forms of arithmetic processing; a flash memory 41 which reads a program from a CD-ROM installed in the information storage device 3 and stores the program; a ROM 42 which stores a program (a program reading means) executing a program check of the program stored in the flash memory 41 and updates the program; a RAM 43 for temporarily storing searched route guidance information such as the location coordinates of a set destination, the code number of a road and data which is in the course of being processed; an image memory 44 containing the image data to be used and displayed on the screen of the display; an image processor 45 for retrieving the image data from the image memory 44 on the basis of the display output control signal from the CPU 40 and graphically processing the image data and outputting the results to the display; an audio processor 46 which, on the basis of an audio-output control signal from the CPU, combines audio phrases, single sentences and sounds, etc. read out of the information storage device 3, converts this retrieved data into an analog signal and delivers the analog signal to the speaker 16; a communication interface 47 for exchange of input/output data by communications; a sensor input interface 48 for receiving a sensor signal from the present-position detecting device 2; and a clock 49 for entering data and time into internal dialog information. Route guidance is performed by both screen display and audio output. The driver can select whether or not audio output is provided.

The program update processing can be stored in an external storage device. Programs in accordance with the present invention and all the other programs for operating the navigational system can be stored in a CD-ROM which is an external storage medium, or a part or all of the above mentioned programs can be stored in the ROM 42.

Data and programs stored in the external storage medium are input to the central processing unit of the navigation system as external signals, and processed so that the variety of functions of a navigation system can be implemented.

A navigation system according to the present invention is equipped with a flash memory 41 which has relatively large capacity, for reading a program from the CD-ROM of the above described external storage device, and a ROM 42 which has a relatively smaller capacity, equipped with a program (a program reading means) for CD-ROM startup processing. In case of a power failure, information contained in the flash memory 41 is maintained, that is to say, it is a nonvolatile memory means. As a startup process, the navigation system activates a program stored in the ROM 42 which is a program reading means, checks a program stored in the flash memory 41, and reads disc control information, etc., from a CD-ROM installed in information memory device 3. Based on the information stored in and the state of the flash memory 41, loading (update processing) of the program is performed.

FIGS. 2 to 5 illustrate exemplary structures of main data files stored in the information memory device. A guidance road data file, as shown in FIG. 2(A), comprises, for each of the roads n in number, a road number, length, road attribution data, shape data address and size, and guidance data address and size, and is stored in a form for providing route guidance based on a route search executed by a route search section.

Road number is set, according to the direction (outbound or inbound) for each road section or segment between intersections. The road attribution data is road guidance supplemental information data and, as shown FIG. 3(A), is composed of data indicating whether the road is an overpass, a road alongside an overpass, an underpass or a road alongside an underpass, number of the lanes, and data indicating whether the road is in the city or in the suburbs. The shape data, as shown in FIG. 2(B) is coordinate data for a plurality of nodes dividing each road and comprising east longitude and north latitude for each of m nodes. The guidance data, as shown in FIG. 2(C), comprises data such as intersection (branch point) names, traffic light data, landmark data, precaution data, and road name data, road name voice data, and address and size of course data.

The precaution data shown in FIG. 3(C), indicates whether or not there is a railroad crossing, a tunnel entrance or exit, or a point of reduced road width. The data is used to warn the driver of the presence of conditions where caution should be exercised, such as a railroad crossing or a tunnel, other than a branch (intersection) point. The road name data, as shown in FIG. 3(B) provides information on road category, such as highway, city highway, toll road or ordinary road (Federal interstate, state road, etc.), and indicates whether the highway, city highway or toll road is a main road or a junction. This data is composed of road classification data and classification numbers, namely individual number data for each road classification. The Course data, as shown in FIG. 2(D), comprises the course route number and course names, the address and size of course name audio data, course direction data, and travel guidance data.

The course direction data as shown in FIG. 2(E), indicates road invalidity (meaning that the course direction data is not used), disuse (guidance is not given), straight ahead, right, slight right, sharp right, left direction, slight left, and sharp left. The travel guidance data, as shown in FIG. 3(D), is for instructing the driver which lane to take when there are a plurality of lanes, or to enable the driver to select among right, left, and center lanes.

In the data structure shown in FIGS. 2 and 3, the road data includes intersection point data; however, intersection point data, as shown in FIG. 4, may be stored separately from road data and may include information on whether or not there is a traffic light at the intersections and information on roads connecting at the intersections. Storing connection information with the road data makes it easier for road data to include data indicating no admission from one road to another. As a result, the volume of data can be minimized. Further, FIG. 5 illustrates an example of guidance phrase data which makes the formation of guidance sentences easier when the system executes route guidance. Storing guidance sentences divided into phrases such as distance phrases, direction phrases, and characteristics phrases, etc., enables the system to set and output guidance sentences for each guidance point by combining phrases, and to form sentence messages such as "Turn to the right at about 300 m ahead."

Figure 6A:
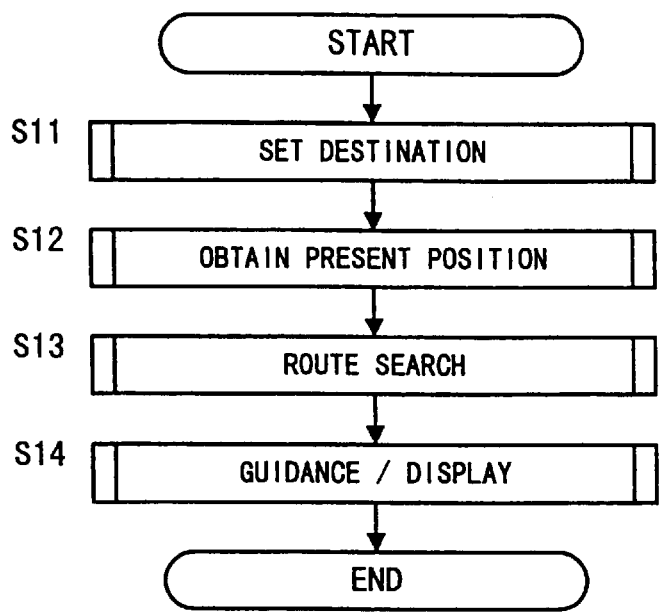
FIGS. 6(A) and 6(B) are flow charts of a routine for operation of the overall vehicle navigation system according to the present invention.
Figure 6B:
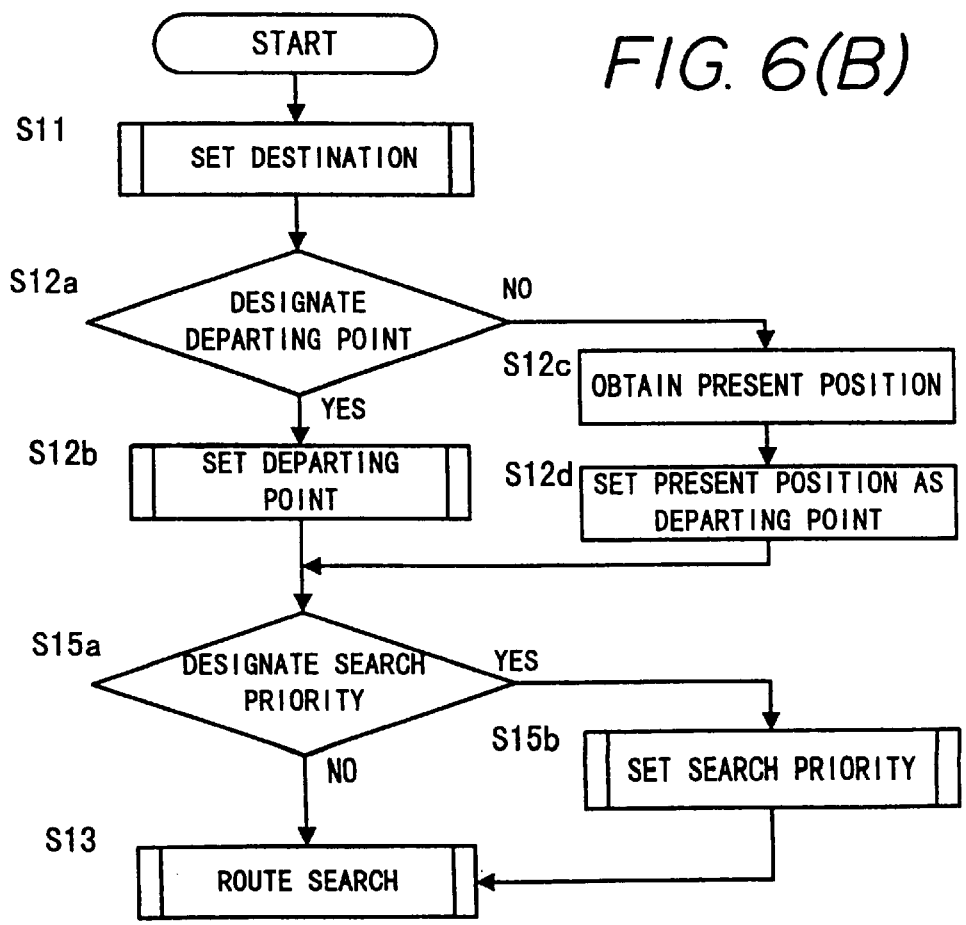

FIG. 6(A) is a flow chart of a routine for operation of the overall navigation system according to the present invention and FIG. 7 is diagram explaining formation of the guidance route by route search executed in the routine of FIG. 6(A). As shown in FIG. 6(B), a CPU 40 comprising a central processing unit 4 reads out a navigation program from a CD-ROM after executing initialization processing, and the read program is stored in a flash memory 41 and activated. Then the navigation system detects a present position by using a present position detection device 2 and displays a map of the vicinity of the present position including the name of the present position, etc. (step S11). Next, the navigation system sets a destination by reference to a telephone number, address, facility name, or registered location, etc., (Step S12), and executes a route search for a route from the present position to the destination (step S13). As a result of this route search, the route to the destination is set as a series of guidance road numbers so that the road sections of the "guidance route" are arranged numerically, as shown in FIG. 7(A). When the route is determined, the navigation system repeatedly outputs guidance information by display and/or audio output until the vehicle reaches the destination, while keeping track of the present position by the present position detection device 2 (step S14).

The present invention determines whether or not the road is in a city (urban area), searches for a route to the destination by giving lower or higher priorities to roads in the cities or in the suburban area (or giving higher preferences). In order to achieve the above result, for instance, the system controls search cost by lowering or raising assigned cost for each road section in the city area or lowering or raising matching cost of the road sections in the suburban area. Whether the road is in the city area or suburban area can be determined by reference to road attribution data shown in FIG. 3(A). Therefore, in the route search, the system may automatically determine whether each road is in a city area or in a suburban area based on such road information and search for a route by giving lower preference (weight) to the roads in the city area in selecting roads for a guidance route. In addition, as shown in the following example, whether or not the system gives lower preferences to the roads in the city area may be determined in accordance with priority designations by the user.

In the case where the user sets search priority for roads in the city or roads in the suburban areas, as shown FIG. 6(B), the system sets the destination (step S11), determines whether or not the departing point is designated (step S12$a$) and, when the departing point has been designated, sets the departing point based on the designation (step S12$b$). When the departing point has not been designated, the system obtains the present position of the vehicle (step S12$c$), and sets the present position of the vehicle as a departing point (step S12$d$). Then, the system determines whether or not search priority has been designated (step S15$a$), and sets search priority when search priority has been designated (step S15$b$).

Figure 8:
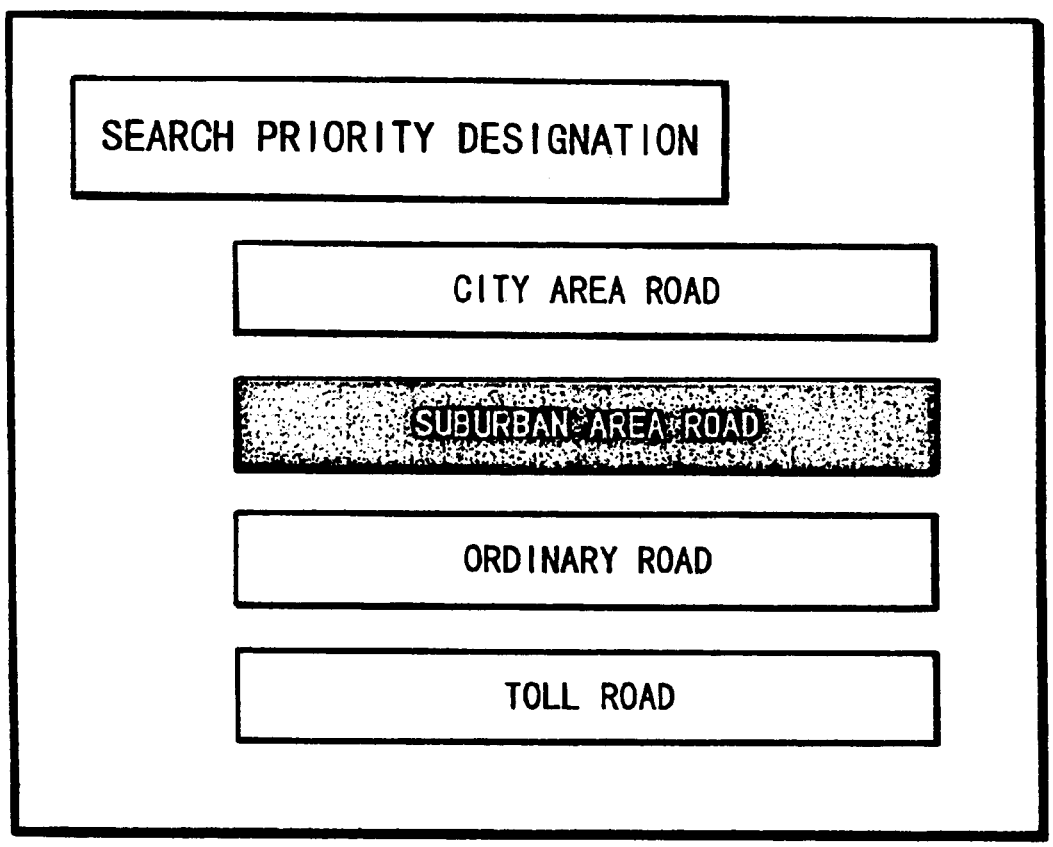
FIG. 8 is a diagram showing an example of a screen for designating search priority.

For purposes of priority designation prior to a route search, as shown in FIG. 8, the system presents a designation screen with a menu of options such as "city area road", "suburban area road", "ordinary road" and "toll road" and the roads falling within the category selected on this designation screen are given higher preferences by lowering their "search cost." Namely, when "city area road" is designated, route search is executed by lowering "search cost" of the roads in the city area, and when "suburban area road" is designated, "search cost" of the roads in the suburban area is lowered.

In a search, "search cost" is normally set for each road section (number) as a total of assessed costs based on factors such as the time required for travel, distance, ease of running (road width, road classification such as Federal Interstate, and the number of traffic lights, etc.), tolls, etc. For instance, when search cost is set by distance, road width and ease of running according to road classification are respectively converted into equivalent distance values. Therefore, even if the actual distance of the compared roads is the same, for instance, the weighted distance of a highway segment may be less than that of another, inferior road segment of the same actual length and the weighted (converted) distance of a branched road segment (segment with intersections) will be longer than that of a main road segment (segment without intersections or with limited access) of the same actual length. Further multiplying this weighted (relative) distance by 0.8, for a road in a suburban area will give the suburban area, road priority designation and enable the system to output a guidance route giving priority to roads in the less congested suburban areas.

Figure 9:
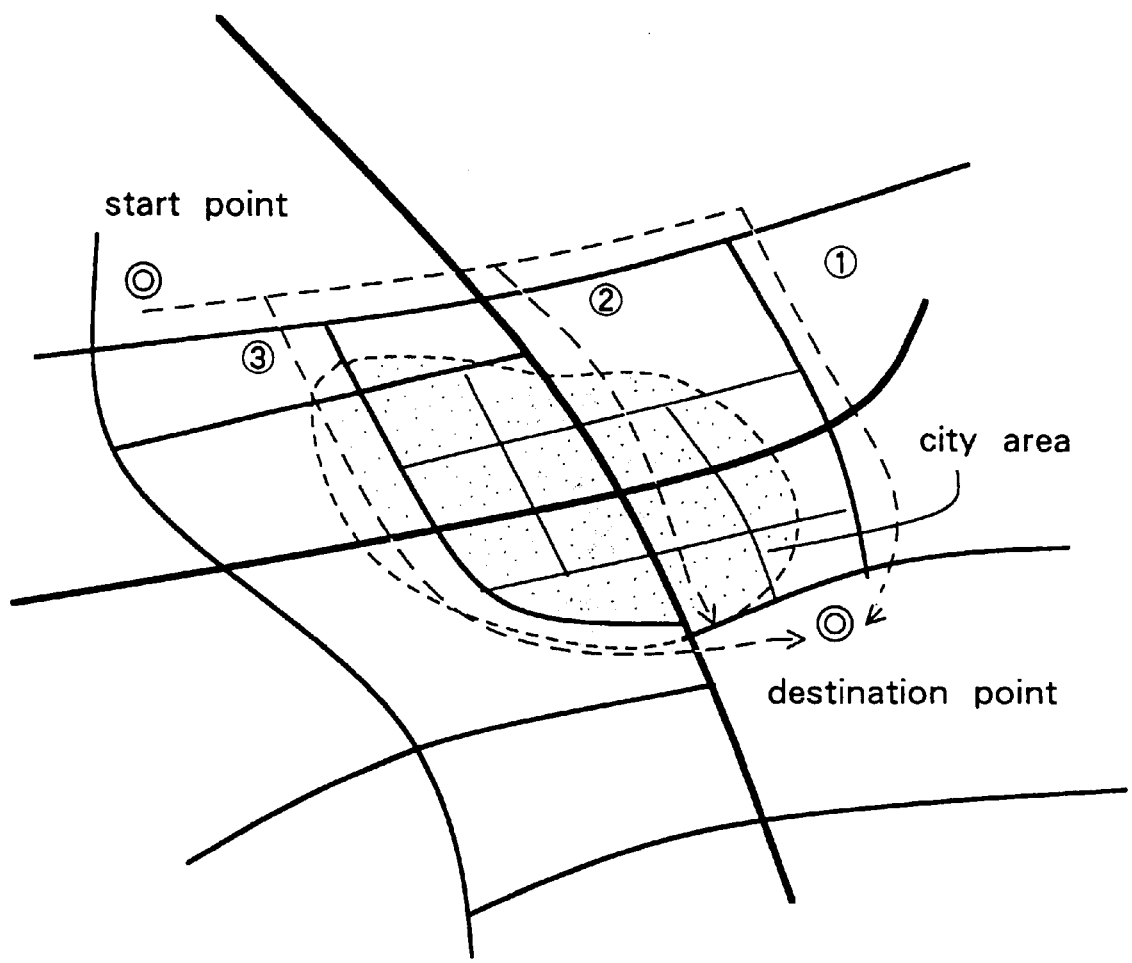
FIG. 9 is a diagram for describing an example of guidance route when there is a city area between the departing point and the destination.

The above mentioned data file includes information on whether a road is in a city area or in a suburban area and is stored as road attribution data, as shown in FIG. 3(A). Alternatively, the city area road may be distinguished from the suburban area road by using other information. For instance, as shown in FIG. 9, displaying a city area distinguished from the suburban area, in the display control information a road including a node having coordinates in the city may be processed as a city area road. Therefore, as shown in FIG. 9, when there is a road network passing through both an urban area and suburban areas and the urban area is interposed between a departing point and a destination, if suburban roads are given a priority designation, a route shown as dashed line 1 is given preference. On the contrary, if urban area routes are given a priority designation, the routes shown by dashed lines 2 and 3 are given preference.

Figure 10:
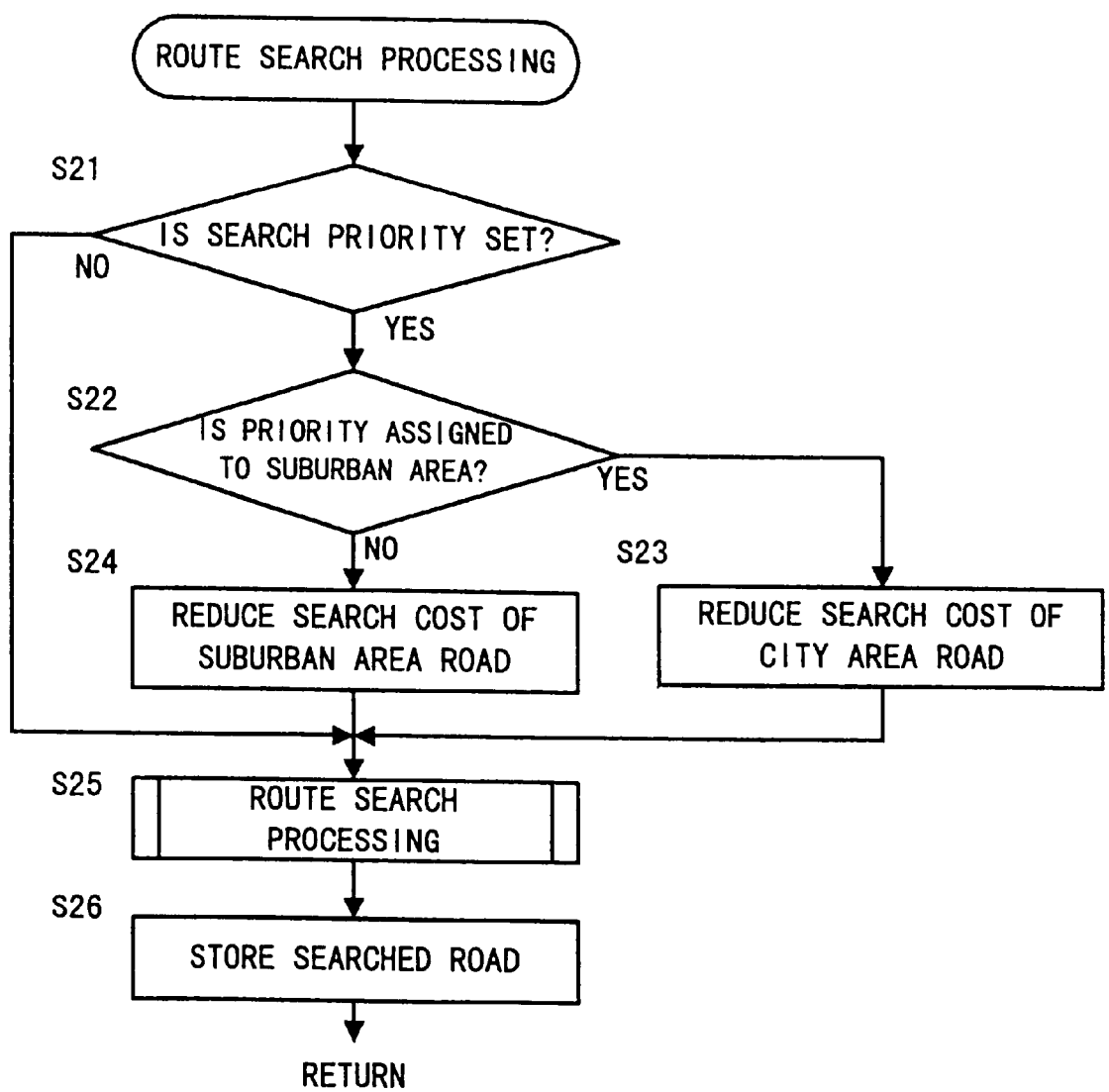
FIG. 10 is a flow chart of an example of a routine for route searching.
Figure 11:
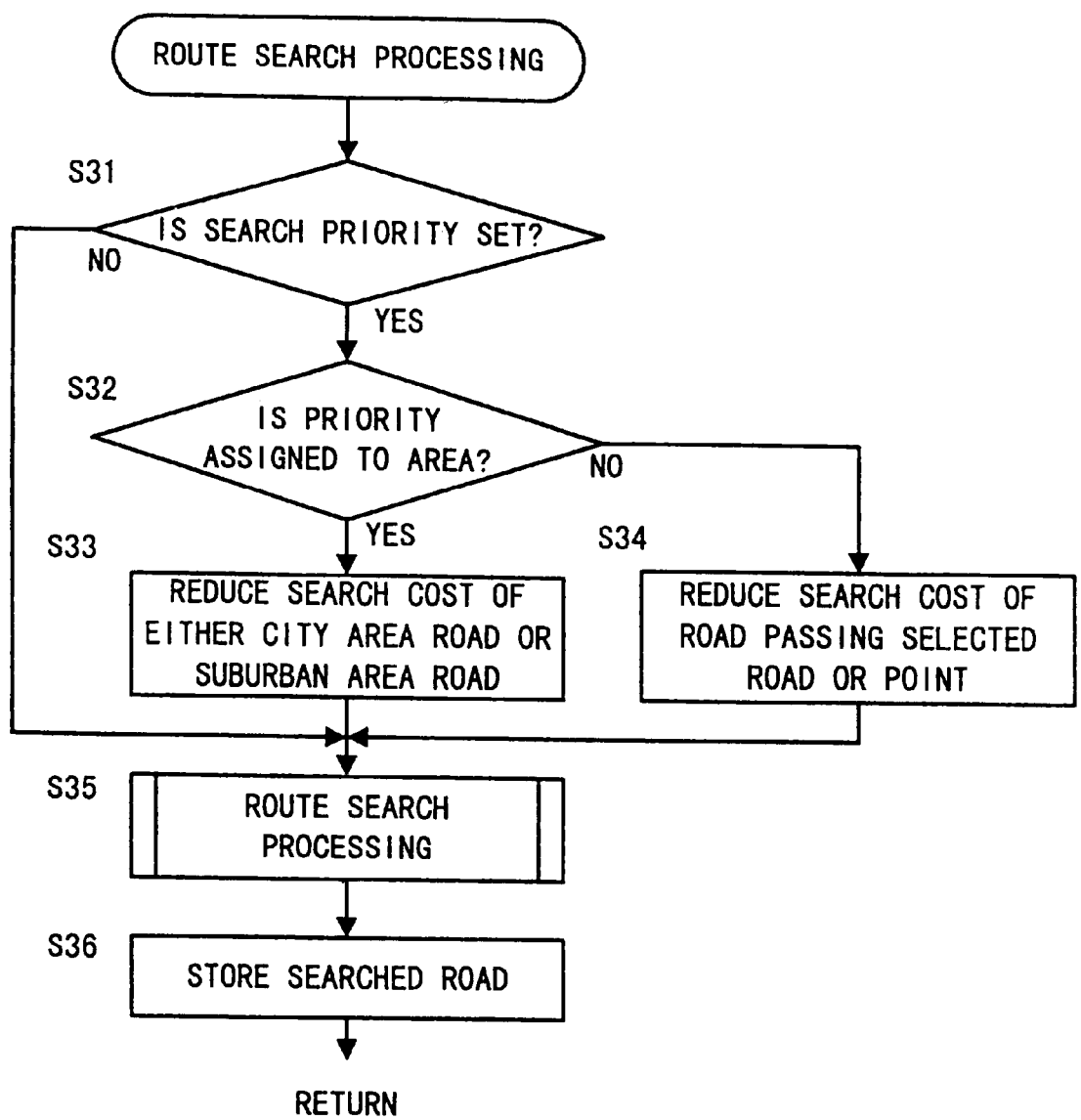
FIG. 11 is a flow chart of another example of a routine for route searching.

FIG. 10 illustrates a routine for optionally giving priority to either city area roads or suburban area roads. FIG. 11 illustrates a routine for assigning priority to either city area roads or suburban area roads, or to either ordinary roads or toll roads.

When either city area roads or suburban area roads are selected for priority designation, as shown in FIG. 10, when the route search is performed, the control routine first determines whether a priority designation has been set (step S21). When a priority designation has not been set, a route search is immediately executed (step S25), when priority designation has been set, a determination is then made as to whether or not suburban roads have been given priority (step S22). As a result, if city area roads have been given priority (YES), the "search cost" of city area roads is lowered (step S23), or if suburban area roads have been given priority (NO), "search cost" of suburban area roads is lowered (step S24), and a route search is executed (step S25). Then the guidance route determined by the route search is displayed and stored (step S26).

In the case where the system is configured in such a way that one can select, as priority designation, either city area roads or suburban area roads and/or can also select a road classification such as an ordinary road or toll road, as shown in FIG. 11, in executing a route search, the system first determines whether or not priority designation has been set (step S31) and proceeds to execute a route search if priority designation has not been set (step S35). On the other hand, when priority designation ("condition") has been set, the system, by operation of the "condition setting means", determines whether the setting is for area priority or road classification priority (step S32), lowers the search cost of city area roads or suburban area roads given priority in the case where area priority has been set (step S33) and lowers the search cost of ordinary roads or toll roads given priority in the case where road classification priority has been set (step S34), and then executes a route search (step S35). Then, the guidance route determined by the route search is then displayed and stored (step S36).

The present invention is not limited to the aforesaid specific embodiments and may be modified as follows. For instance, in the specific embodiments described above, the system determines whether the road is a city area road or a suburban area road by reference to attribution information included in the stored road data or by reference to map coordinate information to determine whether the road is in a city area or a suburban area. However, alternatively, the system may execute priority designation by area. Further, in addition to area priority, other priorities such as highway priority or principal road priority may be used as road classification designation. In another modification, a suburban area road selection may be set to directly execute priority designation whereas selection of the city area road option may allow for selection of the roads the driver desires to travel.

As described above, the system according to this invention controls search cost by priority designation of either city area roads or suburban area roads, and gives lower preference or higher preferences to the designated roads in the course of route searching. This enables a route consisting of less congested roads to be easily selected. Therefore, when the driver desires to simply traverse the route from the departure point to the destination, suburban area roads are given priority designation in order to avoid travel through the more congested city area with many traffic lights. On the other hand, when the driver desires to enter the city area, the city area roads are given priority designation. This means that the driver can select either city area or suburban area priority according to his preference or the conditions.

The entire disclosure of Japanese Patent Application No. 9-214781 filed on Aug. 8, 1997, including specification, claims and drawings, is incorporated herein by reference.

While the invention has been described with reference to preferred embodiments, the foregoing embodiments are merely illustrative of the invention and should not be construed as limiting the invention. Various modifications and applications may be adopted by those skilled in the art without departing from the true spirit and scope of the invention as defined by the appended claims.

What we claim is:

1. A vehicle navigation system comprising:
an information memory containing stored road data for each section of roads sectioned by nodes, said road data including information indicating whether or not individual road sections are within a city area;
route search means for searching to determine a guidance route from a point of departure or the present position of a vehicle to a destination based on the road data stored in said information memory means,
said route search means, in searching for said guidance route, giving weight to the road sections not in the city area, on the basis of said information, in order to give greater preference to the road sections not in the city area as compared to road sections in the city area.

2. The vehicle navigation system according to claim 1, wherein said information is road attribute data which identifies individual road segments as either being in the city area or not.

3. A vehicle navigation system comprising:
an information memory containing stored road data for each section of roads sectioned by nodes, and information identifying individual road sections as belonging or not belonging to a limited area; and
route search means for searching to determine a guidance route from a point of departure or the present position of a vehicle to a destination based on the road data stored in said information memory means, said route search means, in searching for said guidance route, on the basis of said information, assigning search costs to the road sections within the limited area and conducting said searching with weighing of the assigned search costs.

4. The vehicle navigation system according to claim 3, wherein said information is map coordinate information.

5. The vehicle navigation system according to claim 3, wherein said limited area is a city area or a suburban area.

6. The vehicle navigation system according to claim 4, wherein said limited area is a city area or a suburban area.

7. A memory medium for a vehicle navigation system comprising encoded thereon:
road data for each section of roads sectioned by nodes, said road data including information indicating whether or not individual road sections are within a city area; and
a program for searching to determine a guidance route from a point of departure or the present position of a vehicle to a destination based on the road data stored in said information memory means,
said route search means, in searching for said guidance route, giving weight to the road sections not in the city area, on the basis of said information, in order to give greater preference to the road sections not in the city area as compared to road sections in the city area.

8. A memory medium for a vehicle navigation system comprising, encoded thereon:
road data for each section of roads sectioned by nodes, said information identifying individual road sections as belonging or not belonging to a limited area; and
a program for searching to determine a guidance route from a point of departure or the present position of a vehicle to a destination based on the road data stored in said information memory means, said route search means, in searching for said guidance route, on the basis of said information, assigning search costs to the road sections within the limited area and conducting said searching with weighing of the assigned search costs.

* * * * *